United States Patent

[11] 3,588,337

[72] Inventor Ernest John Okleshen
 Fort Wayne, Ind.
[21] Appl. No. 801,609
[22] Filed Feb. 24, 1969
[45] Patented June 28, 1971
[73] Assignee The Magnovox Company
 Fort Wayne, Ind.

[54] MOUNTING MEANS FOR LIGHT SOURCE IN FACSIMILE EQUIPMENT
 5 Claims, 6 Drawing Figs.

[52] U.S. Cl. .................................................. 178/7.1,
 240/37.1, 339/184
[51] Int. Cl. .................................................. H04n 1/02,
 F21v 19/04, H01r 13/64
[50] Field of Search .................................... 178/5, 7.1,
 7.1 (E), 7.6; 339/(Inquired), 184 (L);
 240/(Inquired), 37.1 (X), 44.2 (X); 352/198, 203;
 353/85, 87

[56] References Cited
 UNITED STATES PATENTS
 2,136,789 11/1938 Finch ........................... 178/7.1(E)
 3,475,553 10/1969 Reese et al. ................... 178/7.1

Primary Examiner—Richard Murray
Assistant Examiner—George G. Stellar
Attorney—Richard T. Seeger ABSTRACT: This invention pertains to an improved mounting means for an illuminating source in facsimile equipment in which the illuminating source is accurately positioned in relation to two adjustable reflector means so that each reflector means will focus substantially identical intensity of illumination on a document, to provide substantially identical energization of an optical transducer which translates the intensity of the light received to an electrical output. The improved mounting means consists of a recess which receives a flange forming an integral part of the illuminating means with an accurate and close fitment so that the original illuminating means and any replacement illuminating means are accurately positioned three dimensionally from the respective reflector means and an additional locating means is provided in the form of a pin and detent to define the angular position of the illuminating means. As a consequence, once an initial adjustment is made of the reflector means in relation to the original illuminating means, in a manner effecting substantially identical intensity of focused illuminations on a document, replacement illuminating means can be easily and accurately positioned within the same mounting structure to provide the same equality of intensity of focused illumination from the respective reflectors and without requiring readjustment of the reflectors. The mounting means is intended to accurately dispose the illuminating means in reference to the reflectors three dimensionally and angularly.

3,588,337

INVENTOR
ERNEST J. OKLESHEN
by JEFFERS & YOUNG
Attorneys

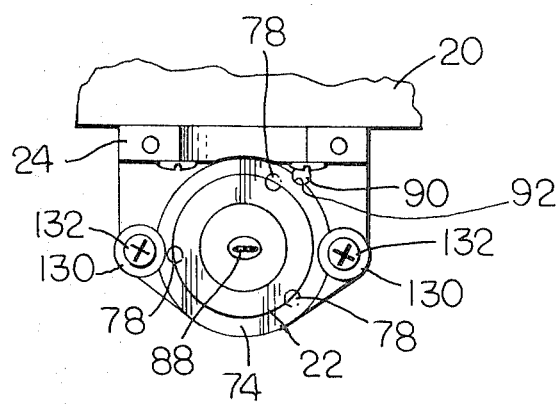
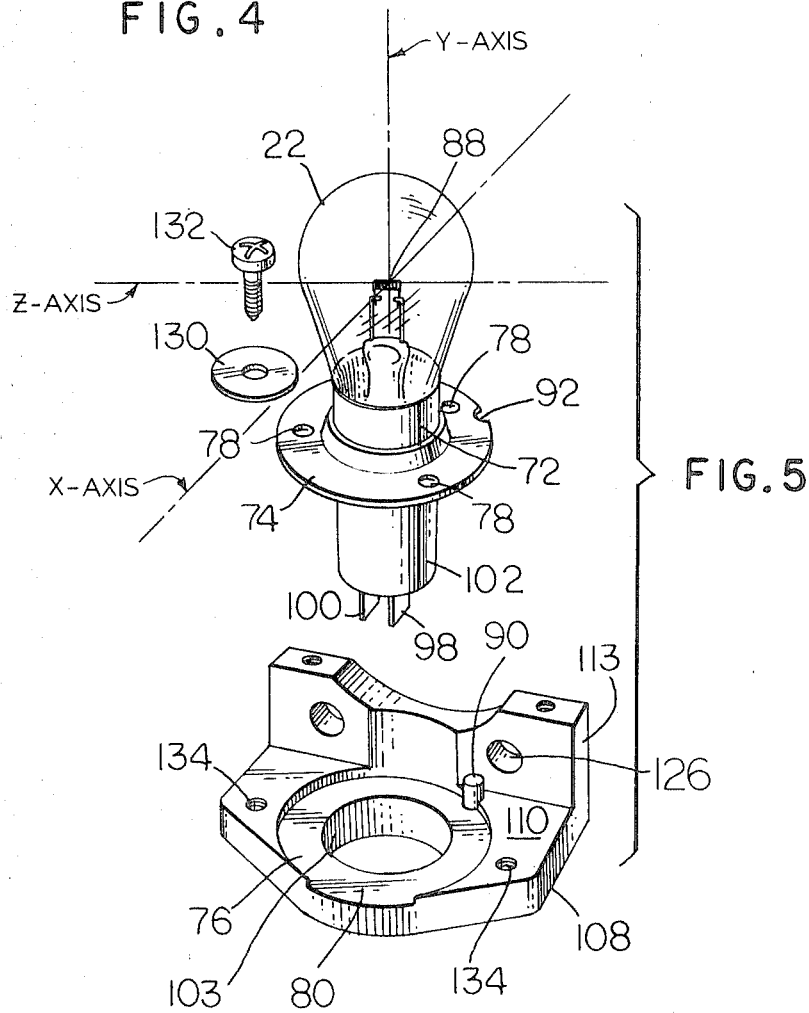

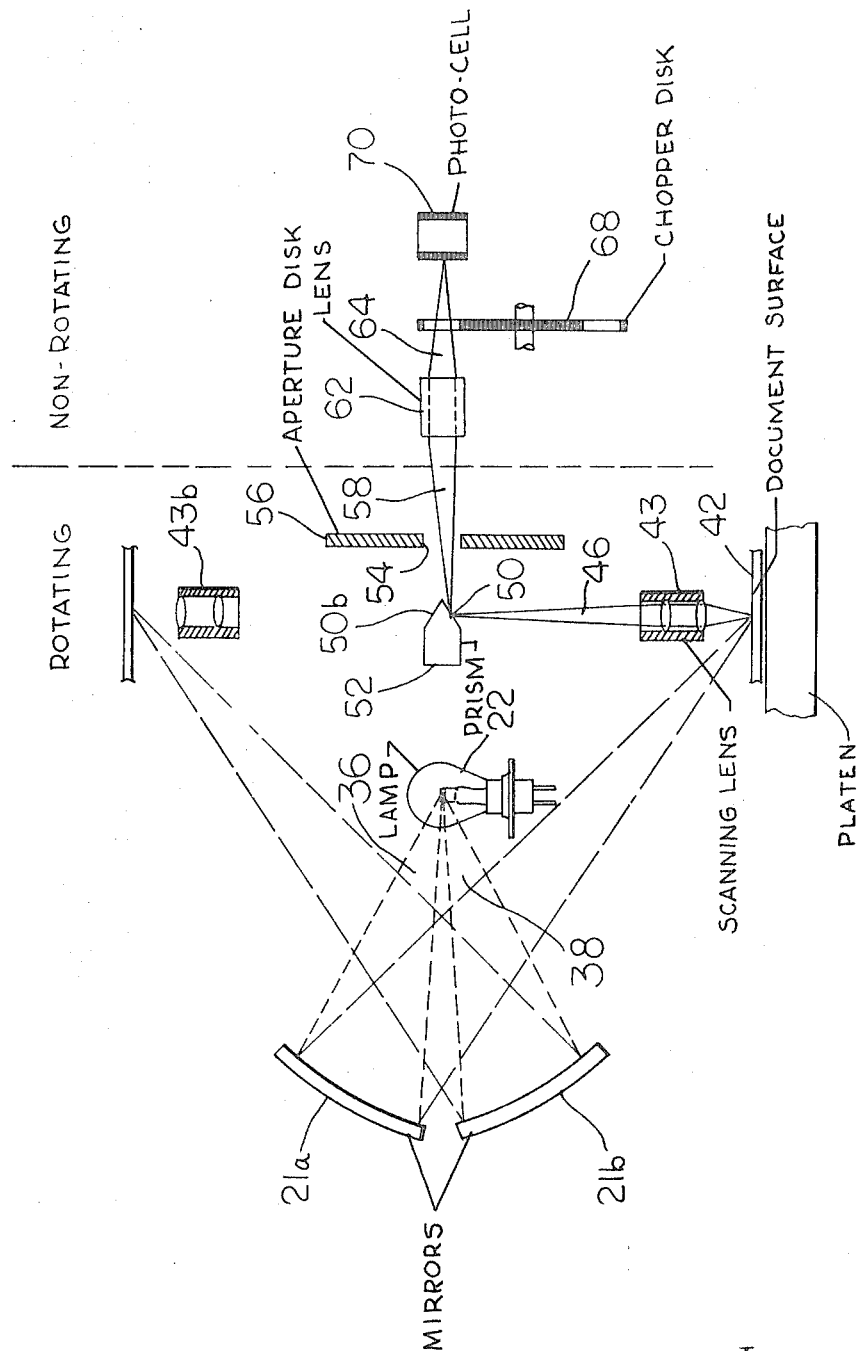

MOUNTING MEANS FOR LIGHT SOURCE IN FACSIMILE EQUIPMENT

In facsimile equipment of the type shown in copending application U.S. Ser. No. 669,315, filed Sept. 20, 1967, there is illustrated equipment which provides a transducing action between the contents of a document and an electrical output having characteristics dependent upon the contents of the document. Briefly, the equipment operates upon the principle of using an illuminating source in combination with two circumferentially spaced reflectors which focus a beam of light upon a document and depending upon the marking of the document there will be reflected a light beam which acts upon an optical transducer which produces an electrical signal that can be transmitted through a telephone network to a coacting receiving machine which converts the signal to a printout.

In order for the device to achieve optimum results, the intensity of light reflected from the respective reflectors, must be of substantially equal intensity upon the document since the machine is responsive first to the reflected light from the document derived from one reflector and then from the other reflector and differences in illumination from improper focusing by the reflectors will introduce an extraneous factor which is undesirable. That is to say, changes in intensity of the reflected light from the document should be responsive only to the contents of the document and this is possible only when the reflectors are properly focused to provide substantially equal intensity of light on the document to be reproduced. In order to achieve such identity of focused light illumination, the reflectors are made adjustable in reference to the light source; but a difficulty arises should the light source become spatially disturbed in relation to the respective reflectors. If the position of the illuminating source should change this will give rise to a difference of illumination produced by the respective reflectors on the document. A further problem has to do with replacement of illuminating source or lamp. Due to limited life of the illuminating source periodic replacement is necessary; however, there is no present ready means for insuring that the replacement lamp will be accurately positioned in respect to the two-spaced reflectors to assure a continued identity of focused light onto the document from the respective reflector means. Of course, the reflectors could be readjusted each time the lamp or other illuminating means is replaced but this can be a difficult time-consuming operation which requires special service equipment and a considerable degree of skill on the part of the service personnel. What is desired, therefore, is to obtain a mounting structure which provides for an accurate positioning of replacement illuminating lamps so that regardless of the number of times the lamp is changed, each replacement lamp can be accurately and easily inserted in place and there will be obtained a substantial identity in focused reflected light from the respective reflector means upon the document. This identity of focused light intensity from the reflector means is an important consideration which directly bears upon the quality of operation of the facsimile device. As a further point of background, the facsimile unit can accommodate to changes in illumination intensity of the lamp itself which normally occurs during the life of the lamp; it can also accommodate to variations in light intensity between identical lamps of the same type but, even though the level of intensity of the light source may change, an identity of reflected light intensity by the two light paths and their respective reflector means must be maintained for optimum result.

OBJECTS OF THE INVENTION

It is a primary object of the present invention to provide an inexpensive but reliable and convenient means for mounting an illumination device within a facsimile unit which can provide for removal and replacement of the original illumination device and still maintain a substantial identity of focused illumination by respective reflector means onto the document which is intended to be scanned and reproduced at a remote location.

It is a further object of the present invention to provide a mounting means for the original illuminating means and replacement illuminating means in a simplified and convenient manner which will insure a substantial identity of focused illumination by a pair of spaced reflector elements, without necessitating a refocusing of the reflector elements from their originally adjusted positions.

Another object of my invention is to provide a mounting and precise lamp locating means for an illuminating source for a facsimile lamp which will allow the use of a relatively inexpensive lamp.

A further object of the present invention is to provide a mounting means for an illuminating source or lamp for a facsimile equipment which does not require manual adjustments in order to properly position the source relative to the other elements of the illuminators and scan optical system.

Relating to the serviceability of the unit, it becomes an overall object of the present invention to provide a unit which can be more easily serviced without requiring special testing equipment and servicing at the time it becomes necessary to replace defective lamps such as ones which do not render sufficient illumination. Heretofore, servicing a unit with a replacement lamp was a much more time consuming and difficult operation and required a substantial degree of skill on the part of the serviceman to perform the necessary adjustments of the light reflecting and collecting means to insure the identity of the light intensity of the two respective light paths. As a result of the present invention, servicing can be simplified, can be made more quickly and hence more inexpensively, and by service personnel who need not employ specialized equipment requiring a higher degree of skill and experience. Consequently I achieve a unit which can be kept in service more conveniently and will render a higher degree of reliability. Other objects and features of the present invention will become apparent from a consideration of the following description which proceeds with reference to the accompanying drawings.

DESCRIPTION OF THE DRAWINGS

FIG. 4 is a top view, looking in the direction of the arrows 4-4 in FIG. 2;

FIG. 5 is an isometric exploded view of the mounting structure for the illuminating means; and, FIG. 6 is a schematic view illustrating the operation of the illuminating and scan optics portion of the facsimile unit.

DESCRIPTION OF THE INVENTION

Figure 1:
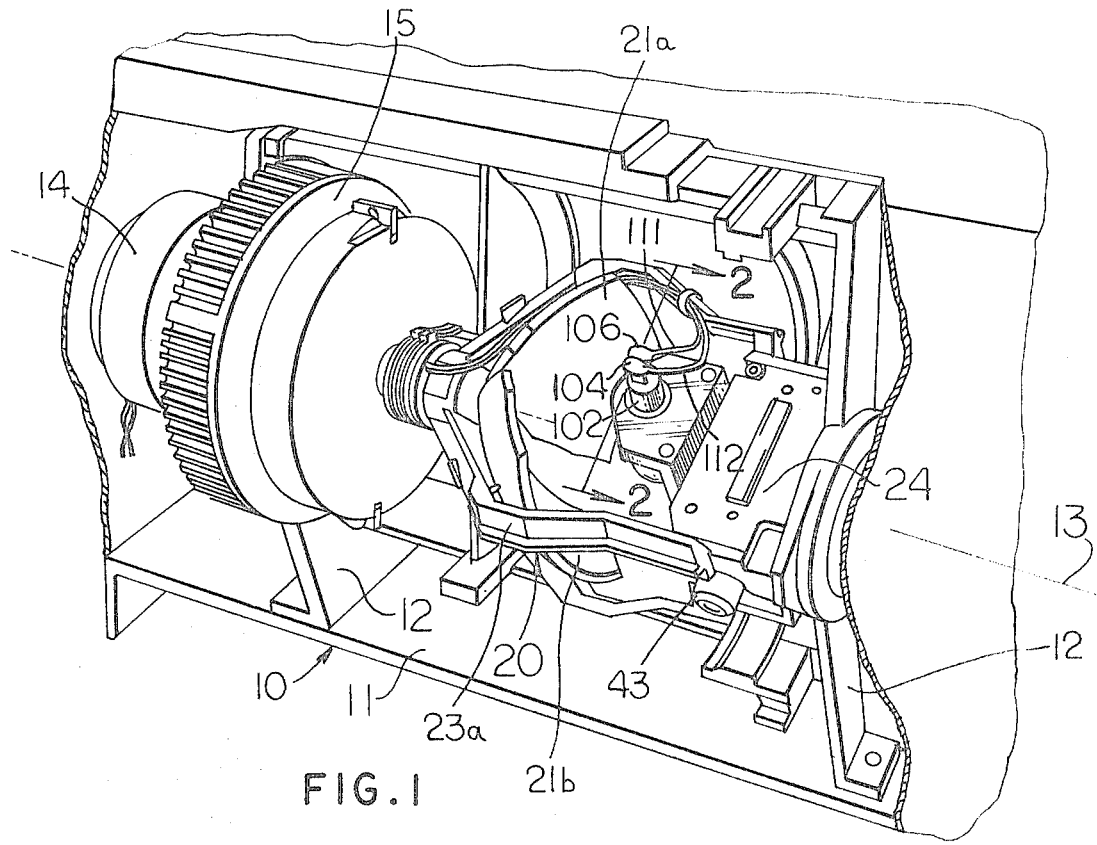
FIG. 1 is an isometric view of a facsimile device, portions being broken away to illustrate the interior of the device.
Figures 2, 3:
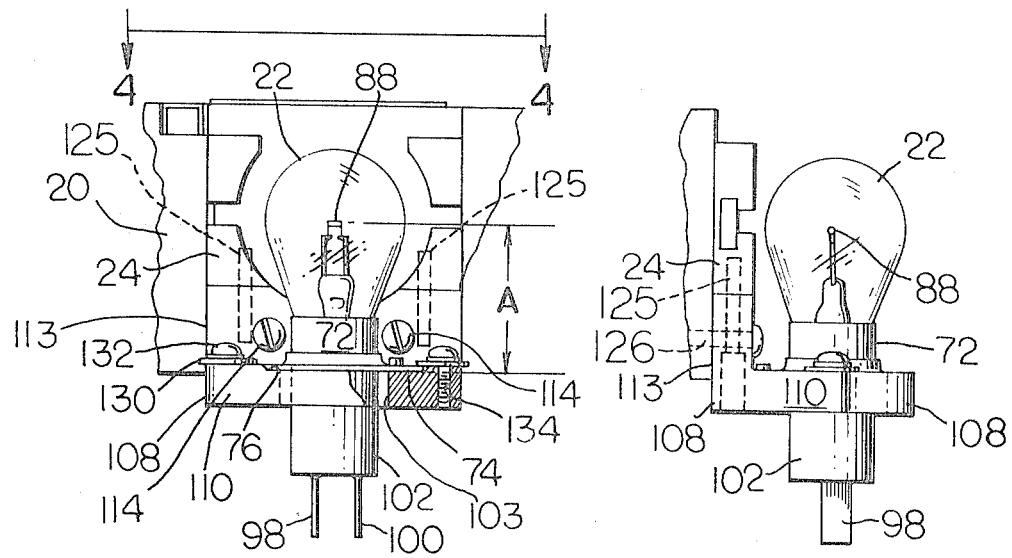
FIGS. 2 and 3 are detail views of the illuminating means and its mounting structure, being front and side views respectively.

For a convenient detailed description of the facsimile device indicated generally by reference numeral 10, reference may be made to copending application Ser. No. 669,315, filed Sept. 20, 1967, entitled "Facsimile Systems," invented by Glen A. Reese and Paul J. Crane and assigned to the same assignee as the present invention.

In FIG. 1, I have shown a facsimile transceiver 10 which can utilize the improved mounting means in accordance with my invention. The transceiver 10 shown in FIG. 1 may also include scanning apparatus for scanning a document and producing electrical signals to be utilized by a receiver at a distant location. The facsimile transceiver 10 is mounted on a suitable base 11 which supports a plurality of brackets 12. The brackets 12 support a rotating structure for writing (and also for scanning if the facsimile transceiver 10 is used to transmit). This rotating structure rotates about a longitudinal axis 13 and comprises a stationary electric drive motor 14. The output from the drive motor 14 is coupled through a speed reducer 15. The output from the speed reducer 15 is communicated to an output shaft (not shown) which rotates about the longitudinal axis 13. A yoke structure generally designated by the numeral 20 is operatively connected to the output shaft. If the facsimile transceiver 10 is used as a transmitter, then the yoke structure 20 may comprise two concave reflecting means or mirrors 21a, 21b which are symmetrically positioned about the longitudinal axis 13 and which receive light from an incandescent lamp 22 whose filament is centered as nearly as possible on the longitudinal axis 13. A set of arms 23a, 23b extend from the output shaft (not shown) around the mirrors 21a, 21b towards the right, as viewed in FIG. 1, and connected with a mounting block 24. The mounting block 24 rotates with the yoke structure 20, and if the facsimile transceiver 10 is used as a transmitter, carries two scanning lens systems or arrangements 43 (only one of which is visible in FIG. 1), and two writing styli (not shown). The facsimile transceiver 10 also includes a cover member (not shown) which is pivotally or otherwise attached to the base 11 to permit the cover member to be positioned around the rotating structure of the transceiver 10. The cover member has a concave (preferably partially cylindrical) platen that receives the paper or copy material to be written upon. When the platen (not shown) is in its proper position, it curves around the rotating structure and is parallel to the longitudinal axis 13. The platen includes means (not shown) for moving the document being written upon parallel to the longitudinal axis 13.

If the facsimile system utilizes two scanning lens systems (FIG. 6), then two writing styli would also be used. Typically, two lens systems and styli are used. Hence, in order to provide compatibility between different facsimile transmitters and receivers, the lens systems and the writing styli should be accurately positioned 180° apart on their mounting block 24.

Referring next to FIG. 6, illumination from incandescent lamp 22 develops light beams 36, 38 which are focused by the respective parabolic mirrors or reflectors 21a, 21b into ellipsoidal spots of light one of which, for a given period of scan, is directed against a portion of the document 42 and is then reflected into a scanning lens 43 where the reflected light is in turn directed as indicated by beam 46 against one face 50 of a prism 52 which in turn directs the light through an aperture 54 of an apertured disc 56, said beam 58 being then gathered and focused by a lens 62 which then directs focused beam 64 past a chopper disc 68 to a photocell 70. The photocell 70 serves an optical transducer, converting the variations of light intensity into an electrical output, this output being transmitted to a receiving unit which converts the signal to a printout device whereby a facsimile copy is produced of the document 42.

My invention lies in the new and improved mounting structure for the incandescent illuminating lamp 22. The reason that the illuminating means or lamp 22 must be accurately positioned is that there are two mirrors 21a and 21b which are utilized, and for proper operation each must develop the same or substantially the same intensity of focused light on the document surface. The two mirrors 21a and 21b are functional at different scan periods to energize the photocell 70, and the change of intensity of light to operate photocell 70 must be only related to what appears on the document surface and not owing to a difference in illumination effect by the lamp 22 through the respective mirrors 21a and 21b because of such mirrors having a difference in focusing effect on the document. For example, at one period of scan the output of the photocell is related to the reflection intensity obtained from the document positioned at the lower part of FIG. 6 via the light beam 36 and respective mirror 21a, and at a following period of scan, the output of the photocell is related to the reflection intensity obtained from the document via the light beam 38 and respective mirror 21b.

Satisfactory operation of the facsimile system herein described depends upon the ability of the two optical scan paths to provide a change in light intensity which is a function only of the markings upon the document, and not upon any change which might be attributed to the respective mirrors. Of course, should the mirrors be in different focus then a different light intensity occurs, not related to the document contents and this introduces an error factor in the facsimile operation.

In order to achieve this identity of focused light on the document surface, at the time of initial assembly when the lamp 22 is originally installed and clamped in place, each mirror 21a and 21b can be individually adjustably positioned so that the focused light is of the same intensity on the document surface at any position of rotation of the mirrors about the axis 13 which rotation, of course, occurs during the normal scanning operation. It is also necessary that the scan paths of each of the focused lights on the document be substantially identical.

In time, the lamp 22 will lose its illuminating intensity, thereby requiring replacement; however, it has been found that the level of intensity of the focused light on the document surface is not so important as the identity of intensity of the light received through one or the other of the reflecting mirrors 21a, 21b and associated light paths 36 and 38.

In order to achieve a near identity of focused illumination, it is essential to properly position the lamp in relation to mirrors 21a and 21b and furthermore, to secure a precise angular position of the filament winding of the lamp in relation to the reflective surfaces of the mirrors.

This accurate positioning both for the original lamp and replacement lamp will be understood from reference to FIGS. 2 through 5.

Referring to these FIGS., lamp 22 has a collar 72 with an integral flange 74 which is received within a recess 76 of the lamp mounting bracket 108 which is dimensioned so that the flange 74 will closely fit therein and, since the flange is accurately dimensioned and maintained with respect to the filament winding, its operative position along the X and Z axes indicated in FIG. 5 is defined. At the bottom of flange 74 are three angularly spaced dimples 78 which bear against confronting surface 80 of recess 76, these three dimples defining the position of illuminating means along the Y axis in FIG. 5. The dimples 78 are accurately dimensioned and maintained so that the perpendicularity of the illuminating means relative to the surface 80 is also defined. As a consequence of accurately fixing these dimensions of the dimples 78 and the interfittment of flange 74 within recess 76 the position of the lamp 22 is accurately three dimensionally fixed with respect to the reflector mirrors 21a and 21b. In addition, the winding of the filament 88 must be accurately disposed relatively to the mirrors so that it is substantially parallel to the Z axis (FIG. 5) and this is secured by means of a locating pin 90 which fits within a detent 92 of flange 74 which is accurately located and maintained. Thus, the lamp is located both angularly and three dimensionally. Once that position is obtained the mirrors 21a and 21b may then be individually adjusted to secure the same intensity of focused light against the document surface.

The electrical contacts or terminals of the lamp 22 and the electrical connections thereto may be of any desired and suitable type or configuration; however, in the embodiment described the lamp terminals 98 and 100 are embedded within a cylinder 102 of any suitable potting material which extends through opening 103, these terminals then being connected with snap-fitting leads 104 and 106 (FIG. 1) which are connected through conductors 111 and 112 to a suitable source of electrical current. The lamp is in turn mounted on yoke structure 20 by means of bracket 108, one leg 110 of which is used to provide the mounting seat for the lamp 22 and the other leg 113 of which is attached to the yoke 20 through a mounting block 24 having threaded openings 125 which receive the mounting screws (not shown) and openings 126 which receive the mounting screws 114.

The lamp, once installed in the mounting bracket 108, is held in place by means of screws 132 and washers 130. The threaded screws 132 are received within companion threaded openings 134 of leg 110, the washers 130 being proportioned to overlie flange 74 by a sufficient amount to insure that the lamp will be held in operative position. The detent 92 on flange 74 will match with the locating pin 90 on mounting bracket 108 to insure the same precise positioning three dimensionally and angularly of the filament with respect to the mirrors 21a and 21b so that illumination from the lamp 22 will develop the same intensity of reflected light on the document and without any adjustment of the reflecting mirrors 21a and 21b. At the time of replacement, the screws 132 can be loosened so that the washers 130, by tilting upwardly, will free the flange 74 so that the entire illuminating lamp 22 can be removed after disconnecting the terminals 98 and 100 from connectors 104 and 106.

The replacement lamp flange 74 can be fitted within recess 76 with its dimples 78 bearing against surface 80 to define the identical lamp position. From the foregoing description it will be seen that replacement of the lamp can be accomplished by a serviceman within only a matter of minutes and does not call for any high degree of skill.

Previously, owing to the multitude of different positions of a replacement lamp, it was found necessary to make adjustments of the mirrors 21a and 21b with the ever-present possibility of securing some out-of-focus or differential illumination on the document surface by the respective reflecting mirrors 21a and 21b. This differential of lighting intensity seriously interfered with the quality of operation of the facsimile device in transmitting to a companion device where printout of the information occurs.

With the present invention it is possible to obtain a light intensity differential of no greater than 6 percent between the two optical paths, which is well within the maximum within the allowable tolerances for satisfactory operation of the facsimile system herein described controls of accurately dimensioned dimples 78 and an accurate angular position of the notch or detent 92 with respect to a filament position 88, I can obtain relatively inexpensive lamps since these critical dimensions can be held within reasonable manufacturing tolerances. The 6 percent deviation from identity of focused light intensity is a very substantial step forward in the art when it is considered that in previous arrangements for mounting of lamps a deviation in excess of 13 percent was not as all uncommon. The deviation from identity in the respective illumination intensities on the document from one reflector to the other is picked up as a deviation in voltage output from the optical transducer photocell 70 and can cause activation of any automatic background control circuitry if so used, which activation is undesirable since it is preferred that the reflected light from the document itself control such circuitry.

An alternative method for replacing lamps is to remove the attachment screws 114 received within the openings 126 in leg 113 of the mounting bracket 108 and remove additional attachment screws (not shown) which screw into threaded openings 125 in mounting block 24 of the yoke 20 thereby permitting detachment of the entire mounting bracket 108 with its attached illuminating lamp 22. I can then replace the entire described structure with a replacement mounting bracket and attached lamp. In this described method of servicing, an accurate disposition of the lamp is also obtained with equivalent results in operation of the facsimile device. Either method of servicing can be employed as the serviceman desires.

Although the replacement lamp may vary in intensity from the original lamp, the essential criteria, which is to obtain a near identity of the focused light on document surface, can be consistently achieved.

Although the present invention is illustrated and described in connection with a single example embodiment, it will be understood that this is illustrative of the invention and is by no means restrictive thereof. It is reasonably to be expected that those skilled in this art can make numerous revisions and adaptations of the invention and it is intended that such revisions and adaptations will be included within the scope of the following claims as equivalents of the invention.

I claim:

1. In a mechanism of reproducing facsimiles, an illuminating source, reflector means, and support means for accurately adjusting the position of said illuminating source to be received by said support means at a precise predetermined location in relation to said reflector means and for defining the angular orientation of said illuminating source relative to said support means, said support means including, interfitting portions of said support means which define in each of three dimensions the position of said illuminating source relative to said support means, two additional interfitting portions which define the angular orientation of said illuminating source at its operative position, means for detachably clamping said illuminating source at its defined operative position, said support means adapted to receive said illuminating source so that said source may be removed and replaced in its predetermined location without further adjustment.

2. The structure in accordance with claim 1 including means for electrically coupling said illuminating source to a source of electrical energy at whatever angular position is provided therefore.

3. In a facsimile system using an optical transducer for scanning a document to produce at each instant an electrical output having characteristics dependent upon the contents of said document, a light source for illuminating the document, two spaced reflector means for receiving illumination from said light source and directing such light at substantially the same intensity to said document where it is reflected to said optical transducer responsively to the contents of said document, and means for accurately mounting said light source in relation to each of said reflector means and including a base having a seat, a locating member of said light source proportioned to fit against said seat to define the distance between said light source and each of said reflector means, and a combination detent-and-projecting member which defines the angular position of said light source at its mounted position, said seat being formed as a recess and said locating member being proportioned to fit within said recess, at least three circumferentially spaced dimples formed integrally with said locating member which are arranged to bear against the confronting surface of said seat to define the perpendicular position of said light source relative to said b8se.

4. In a facsimile system using an optical transducer for scanning a document to produce at each instant an electrical output having characteristics dependent upon the contents of said document, a light source for illuminating the document, two spaced reflector means for receiving illumination from said light source and directing such light at substantially the same intensity to said document where it is reflected to said optical transducer responsively to the contents of said document, and means for accurately mounting said light source in relation to each of said reflector means and including a base having a seat, a locating member of said light source proportioned to fit against said seat to define the distance between said light source and each of said reflector means, a combination detent-and-projecting member which defines the angular position of said light source at its mounted position, and removable retainer means secured to said mounting means and arranged to bear against said locating member to retain said light source in its operative position.

5. The structure in accordance with claim 4 wherein said removable retainer means includes overlying members which extend over said locating member.